Figure 1:
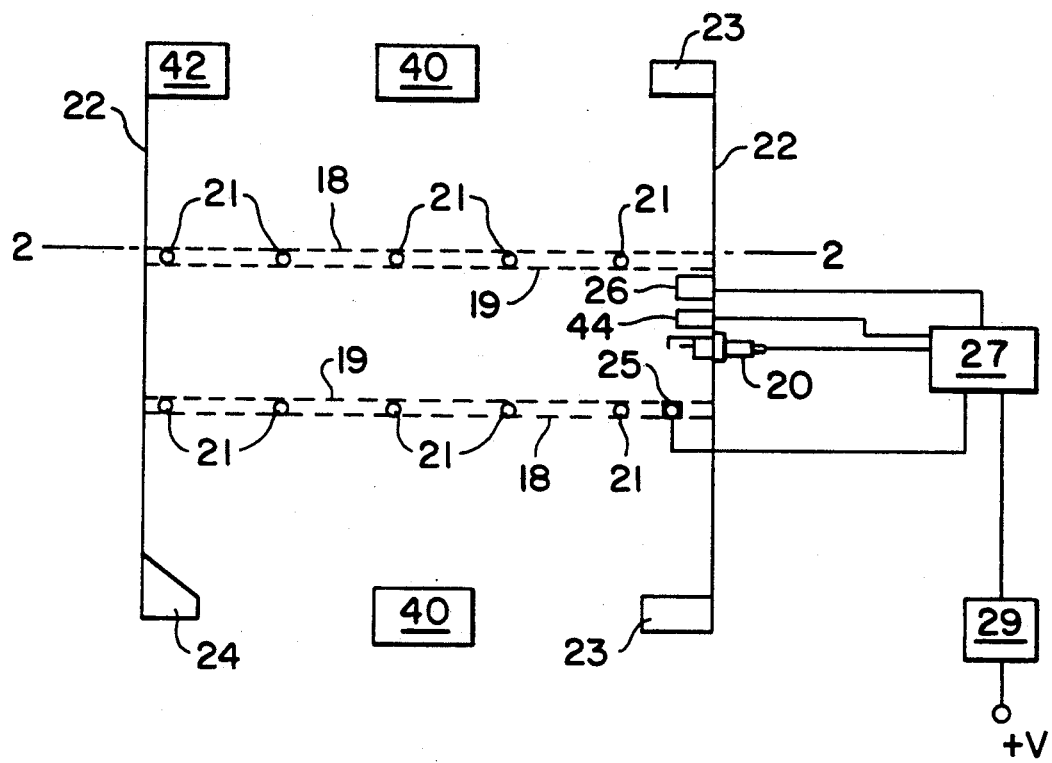

United States Patent [19]

Wiesemes

[11] Patent Number: 5,230,859
[45] Date of Patent: Jul. 27, 1993

[54] PROCESS AND DEVICE FOR REMOVING FLAMMABLE GAS MIXTURES IN A GAS SPACE

[76] Inventor: Johannes Wiesemes, St. Magdalenenstr. 74, D-5020 Frechen 4, Fed. Rep. of Germany

[21] Appl. No.: 613,883
[22] PCT Filed: Jun. 13, 1989
[86] PCT No.: PCT/DE89/00383
§ 371 Date: Dec. 14, 1990
§ 102(e) Date: Dec. 14, 1990
[87] PCT Pub. No.: WO89/12897
PCT Pub. Date: Dec. 28, 1989

[30] Foreign Application Priority Data

Jun. 14, 1988 [DE] Fed. Rep. of Germany ....... 3820187
Jul. 11, 1988 [DE] Fed. Rep. of Germany ....... 3823421
Oct. 1, 1988 [DE] Fed. Rep. of Germany ....... 3833401
Jan. 19, 1989 [DE] Fed. Rep. of Germany ....... 3901382

[51] Int. Cl.$^5$ ............................................. G21C 9/00
[52] U.S. Cl. ................................... 376/301; 376/300; 423/580
[58] Field of Search ................ 376/300, 301, 314; 423/580

[56] References Cited

U.S. PATENT DOCUMENTS

| | | | |
|---|---|---|---|
| 3,598,699 | 4/1969 | Hartman, Jr. et al. | 376/300 |
| 3,679,372 | 7/1972 | Hartman, Jr. et al. | 376/300 |
| 3,986,839 | 10/1976 | Queiser et al. | 376/301 |
| 4,228,132 | 10/1980 | Weems et al. | 376/300 |
| 4,425,495 | 1/1984 | Cake et al. | 376/300 |
| 4,780,271 | 10/1988 | Dezubay et al. | 376/300 |
| 4,911,879 | 3/1990 | Heck et al. | 376/301 |

FOREIGN PATENT DOCUMENTS

3035103A1 9/1980 Fed. Rep. of Germany.

Primary Examiner—Daniel D. Wasil
Attorney, Agent, or Firm—Foley & Lardner

[57] ABSTRACT

To ensure safe removal of flammable explosive gaseous mixtures, the flammable mixtures are burned and/or recombined in partial volumes of the container separated from the rest of the container by metal grilles (18,19). The combustion is thereby prevented from spreading by the principle of the Davy safety lamp. The combustion and/or recombination in the partial volumes is effected by means of ignition sources (20), such as electric sparks, hot surfaces, open flames and/or catalytic surfaces. The heat energy released during combustion is transferred by means of cooling devices such as heat pipes. The temperature of the grille is sued to control the energy supply of the ignition source(s) and should never exceed approximately ⅔ of the ignition temperature of the flammable gaseous mixture; when the temperature reaches ¾ of the ignition temperature, a fuse cuts off the energy supply. If the grille suffers mechanical damage, it touches an electrically insulated internal grille. This spark-free contact triggers an electrical switch which cuts off the power supply to the ignition and/or glow plugs. Detonatable H2-air mixtures can thereby be removed without the risk of explosion.

25 Claims, 2 Drawing Sheets

PROCESS AND DEVICE FOR REMOVING FLAMMABLE GAS MIXTURES IN A GAS SPACE

The invention relates to a process for removing flammable gas mixtures in a gas space. The invention also relates to devices for carrying out such processes. In some processes, for example of a chemical nature, the formation of flammable gas mixtures is unavoidable. Explosions of flammable gas mixtures can cause considerable damage to the plants containing these gas mixtures.

The removal of a hydrogen/air mixture after a core-melting accident in a nuclear power station (NPS) serves as an application example for describing the invention.

In the event of core-melting, large quantities of hydrogen are released within a short time in the containment vessel (CV) of the NPS due to metal/water reactions, which hydrogen must be removed immediately from the gas space of the CV, so that no uncontrolled reactions of the hydrogen ($H_2$) with the oxygen ($O_2$) of the CV air are ignited; otherwise, it would not be possible to exclude premature CV failure in such a case in the event of an $H_2/O_2$ deflagration or detonation.

It has been proposed to use open ignition sources for removing such a flammable hydrogen/air mixture. Battery-operated spark gaps of catalytic ignition devices are on offer //Siemens: Hydrogen ignition device, Order No. A 19100-U822-A107 May 1988// which initiate a deflagration or detonation in an ignitable hydrogen/air mixture in the containment vessel of a nuclear power station, for example in the event of a core-melting accident.

Further processes for the recombination of $H_2$ and $O_2$ have been known for a long time, for example:
  continuous flow processes—The explosive mixture is passed through pipes into a reaction chamber and recombined therein, for example thermally or catalytically. With a free volume of about 70,000 $m^3$ of the CV of a German light-water reactor, the continuous flow process proves to be unsuitable because of the extremely long time required; this includes Swiss Patent Specification 514,217 which describes the formation of a combustion chamber in a line carrying an exit gas flow by means of porous isolation devices.
  Multiple, local recombination processes—Predominantly catalytic recombinators (contact catalysts) have been proposed. Catalytic processes react very sensitively to traces of catalyst poisons. If catalytic surfaces act as recombinators, they heat up in the case of sufficient $H_2/O_2$ availability to temperatures > ignition temperature of the explosive $H_2/O_2$ mixture //loc. cit. Siemens, May 1988// and initiate a deflagration or detonation in the CV.

It is also known that flammable gas mixtures present in a container deflagrate below the detonation limit if the ignition occurs at one place in the container. It is also known, however, that, as a result of almost simultaneous ignition of a flammable gas mixture likewise below the detonation limit at various points in a container, detonation-like effects, which do not occur in the case of local ignition at only one point in the container under otherwise the same overall conditions, are already reached as a result of a kind of explosion jet. Even without detonation-like effects, a hydrogen deflagration in the CV of an NPS can lead, as a result of the associated release of heat energy, to the build-up of a pressure of > 10 bar, which exceeds the failure pressure of the CV of 9.5 bar.

The question whether detonations—even if they may be locally limited—in the case of serious nuclear power station accidents, such as e.g. core-melting accidents, should be accepted in the CV, if the CV represents the last intact barrier towards the environment, has not yet been checked by large-space experiments in a sensible volume ratio to the CV, but only by means of computer calculations for simulated accident sequences. All such computer codes require the fixing of defined overall conditions which must completely cover and describe the serious accidents, for which the nuclear power stations are not designed. This leaves open the question whether and to what extent potential core-melting accidents may perhaps deviate from the preconceived ideas of the users of such simulation codes with respect to the sequence of events.

It has been proposed for the removal of hydrogen in a boiling-water reactor to arrange in a line carrying exit gas (inter alia $H_2$ and $O_2$) a first porous isolation element, an ignition source and a second porous isolation element, in order to burn $H_2$.

The porous isolation elements arranged transversely to the line exert a considerable flow resistance to the flow of a flammable gas mixture, which resistance is overcome by a corresponding differential pressure. The flammable gas mixture is continuously burned after a single ignition in the combustion chamber formed between the first and second porous isolation element, since the first porous isolation element acts like a gas burner, the combustion chamber being selected to be sufficiently narrow for avoiding damage which can arise due to an explosive ignition of the flammable gases; in fact, a rapid pressure relief through the porous isolation elements is not possible because of the nature of pores.

The invention is based on the object of allowing an explosion-proof, short-period removal of a flammable gas mixture even in a relatively large gas space. This object is achieved by burning or recombining the flammable gas mixture in numerous part volumes which are divided off from the remaining gas space by grilles.

The combustion in the interior of the part volumes is effected by ignition sources such as
  electric sparks via spark gaps
  hot surfaces on glow igniters (glow plugs)
  naked flames and/or
  catalytic surfaces.

The invention utilizes a suitable combination of devices known for a long time:
  miners' safety lamps with a naked flame according to Davy—miners' safety lamps as a light source with a naked flame have proved themselves for a long time as explosion-proof (protected) light source in mines even in the case of explosive methane/air mixtures. If more than 1% of methane is present in the mine air, a bluish cap, which spreads with increasing methane content, appears above the luminous flame. The design of the miners' safety lamp is as a light source with the naked flame; it is unsuitable for the removal of flammable gases since, for example, explosion-like combustion processes cannot occur in the interior of the miners' safety lamp, because the distances between the flame and the wall are too small.

Sparking plugs or glow plugs in internal combustion engines—Sparking plugs or glow plugs have proved themselves for decades as suitable ignition sources for explosive gas mixtures in internal combustion engines. Electric sparks ignite hydrogen/air mixtures with a hydrogen content from 4 to 75% by volume.

Catalytic igniters—Platinum surfaces have proved themselves as igniters for hydrogen.

Naked flames—Naked flames have been known for a long time as igniters in gas burners.

The process proposed here, predominantly with the devices tested for a long time in mining and in internal combustion engines, is described by reference to the example mentioned: a grille divides off a part volume from the remaining gas space. The grille is a wire netting made of metal, preferably of stainless steel. The grille shows only a small flow resistance to gases and vapors. The flammable gas mixture is present without a differential pressure in the part volume in the same concentration as in the remaining gas space. If an ignition with explosion-like combustion occurs in the part volume, the grille prevents spreading of the explosion-like combustion into the remaining gas space, if the mesh width of the grille is selected sufficiently small, depending on the flammable gas mixture present. For hydrogen/air mixtures, a grille mesh width smaller than or equal to 0.2 mm and greater than or equal to 0.05 mm has proved suitable. After the explosion-like combustion has taken place, vaporous or gaseous combustion products can flow out of the part volume virtually with hardly any hindrance. Due to the heat of combustion released, the combustion products are hotter than the surrounding atmosphere of the flammable gas mixture and generate a thermal upflow, so that further, cooler unburned gas mixture flows into the part volume and can again be ignited. As a consequence thereof, it proves to be advantageous to choose the geometrical shape of the part volume with a large surface area and a small height. In the case of an unduly small distance between the point of ignition and the next point of the grille, however, no explosion-like combustion in the part volume, but a continuous combustion in the interior of the part volume takes place. In this case, the part volume acts as a combustion chamber of a continuous combustion, as described, for example, in Swiss Patent Specification 514,217. The porous isolation elements described therein for dividing off the combustion chamber in an exit gas line are unsuitable for an explosion-like combustion, since sufficiently fast flowing out of the combustion products through the pores of the isolation elements cannot take place. It is therefore stated therein on page 6, lines 26 et seq.: "In the case that the flame should temporarily go out and must then be re-ignited, the space between the isolation elements 52 and 53 is sufficiently narrow for avoiding damage which can be caused by explosive ignition of the gases between the isolation elements." In contrast to the porous isolation elements proposed therein, a grille of suitable mesh width as a divider from the remaining gas space allows an explosion-like combustion of the gas mixture in a part volume which is substantially greater than that achievable by porous isolation elements.

According to the invention, the smallest distance between the point of ignition and the grille is therefore selected such that only an explosion-like combustion can occur in the part volume. A continuous combustion would not be controllable from the outside and might lead to overheating of the grille and hence to an ignition in the remaining gas space; this might trigger an explosion outside the part volume, which is precisely what must be prevented.

Figure 2:
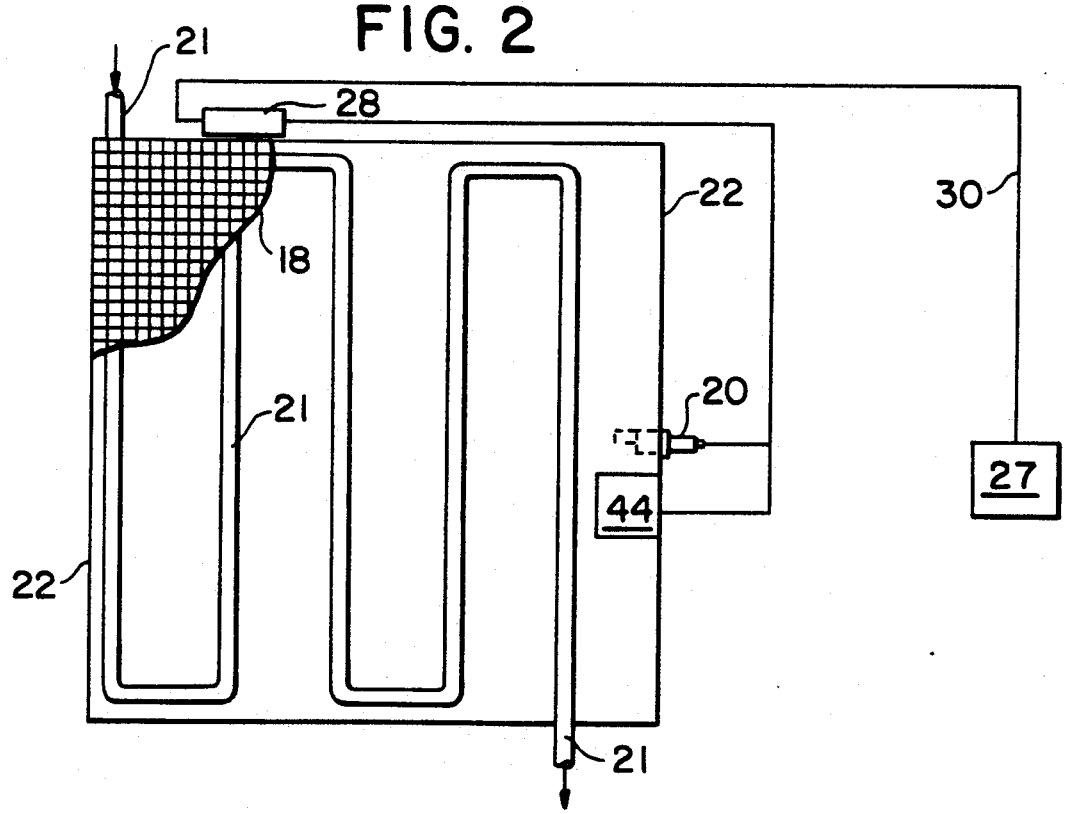
Figure 3:
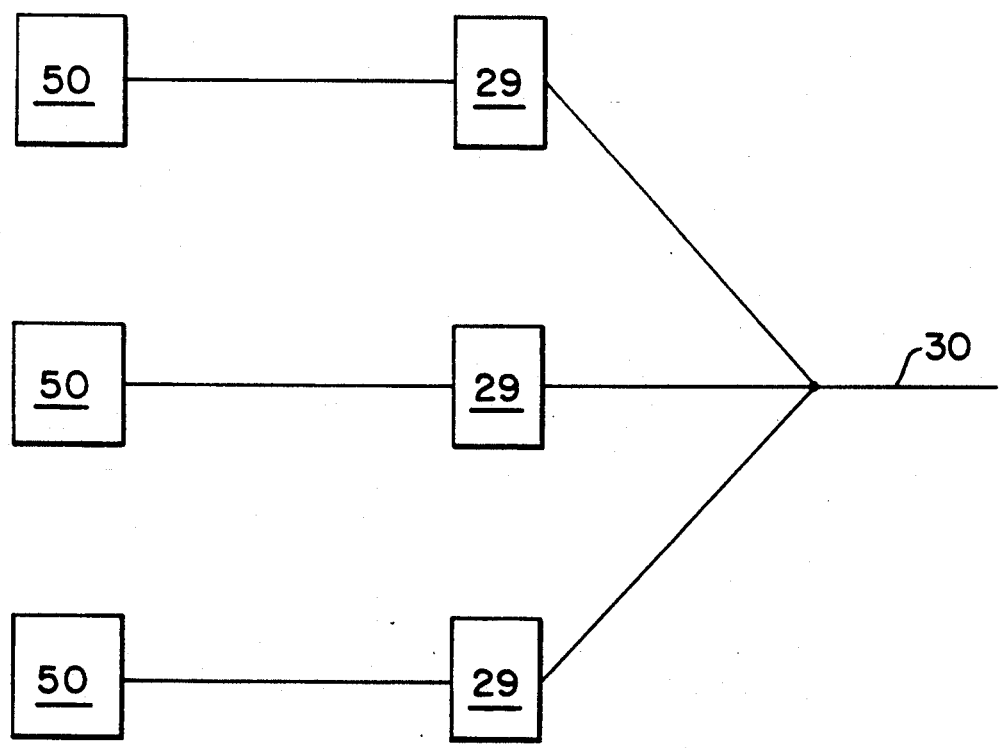

The invention will be explained in more detail by reference to an illustrative example, with the aid of the figures in which FIG. 1 schematically shows, as a section, a reduced illustration of the novel device for the removal of flammable gas mixtures, FIG. 2 shows a section along the line 2—2 through the device according to FIG. 1 and FIG. 3 schematically shows a second embodiment of the invention.

In the device shown in FIG. 1, the flammable gas mixture is ignited between the inner grilles (19) by the sparking plug (20). Ignition sources 44 other than the sparking plug 20 may be used, for example, glow plugs, naked flames, or catalytic surfaces. The explosion-like combustion remains restricted to the space between the inner grilles (19). The hot combustion products can flow out through the grilles (18, 19) almost unhindered—preferentially upwards. The baffles (22) produce a chimney effect and reinforce the convection. In addition, the heat energy is removed by the cooling lines (21) carrying a coolant. Fresh, unburnt gas mixture flows into the space between the inner grilles (19) and is again ignited.

The arrangement, as an example, of sparking plugs and glow plugs as ignition sources in the part volume proves to be particularly suitable for control of the combustion from the outside.

For reliable prevention, in the case of mechanical damage to the grille, of a propagated ignition of the explosion through an opening thus formed into the remaining gas space, 2 grilles, electrically insulated from one another, are arranged at a mutual distance around the part volume. If external (for example mechanical) actions on the outer grille occur, the inner grille and the outer grille can come into conductive contact. This triggers a sensor 25 and interrupt switch 27 which interrupts the energy supply to the sparking plug and glow plug. The conductive contact of the two wire grilles is intrinsically safe and cannot initiate any sparks, since the potential difference between the grilles and the electric currents flowing on contact are chosen such that they are insufficient for spark formation.

For reliable prevention of an explosive ignition in the remaining gas space by an overheated grille, the following measures are taken:

interruption of the lead 30 to the sparking plug and glow plug by means of a corresponding output signal of a temperature sensor 26 which is arranged on one of the grilles, expediently on the inner grille.

Control of the ignition sequence frequency by the corresponding output signal of the temperature sensor 26.

A maximum temperature of the inner grille of about $\frac{2}{3}$ of the ignition temperature of the flammable gas mixture in ° C. on hot surfaces is appropriate.

A failure of an individual temperature sensor 26 cannot effect overheating of the outer grille and hence an explosion in the remaining gas space by this hot surface, since a fusible cut-out 28 as a passive safety element already finally interrupts the energy supply at $\frac{3}{4}$ of the surface temperature in ° C., at which the gas mixture ignites; as an example, the following may be stated with regard to the heat removal after an NPS accident with $H_2$ release into the CV:

At high $H_2$ conversion in the devices, additional measures for lowering the temperature are necessary, which are provided according to the invention as follows:

A natural convection through the part volumes, resulting during $H_2$ combustion, is reinforced by suitable devices such as, for example, fans 40 and/or baffles 22 having a chimney effect; with the increased atmospheric convection, more heat energy can be removed per unit time and larger quantities of $H_2$/air mixture can be fed;

cooling of the inner and/or outer grille is effected, for example, by cooling lines 21 carrying a coolant flow, and heat pipes 21 show particular suitability for transporting the heat energy released by the combustion in the interior of the part volume into the remaining gas space.

In the case of $H_2$/air mixtures in the region of the lower ignition limit, hot surfaces of glow plugs prove to be more appropriate than ignition sparks from sparking plugs to remove the burning gas mixture. In cases, where different $H_2$ concentrations are to be expected, a combination of glow plug and sparking plug in a device is preferred according to the invention, so that glow plugs can be used preferentially in the region of the lower ignition limit and sparking plugs can be used to an increasing extent at higher $H_2$ concentrations.

The removal of the flammable gas mixture in the devices can be monitored as follows:

by sensors 23 which are arranged below and above one or more devices and allow a comparison of temperatures in the gas atmosphere, by sensors 24 which detect the electromagnetic radiation generated during the combustion reaction, by sensors 42 which detect the absorption of electromagnetic radiation which is absorbed by combustion products.

In a local region, an undesired, local pressure rise can occur as a result of simultaneous ignition in a plurality of multiple part volumes, since the combustion products—for example water vapor—are very hot. Different ignition times in these part volumes prevent such a local pressure rise; appropriately, this can be prevented by means of delay devices 29 in the branches of the lead 30 upstream of the devices 50. The following advantages are associated with the invention: in the combustion of, for example, hydrogen from a post-accident atmosphere of a nuclear power station, preferably with the aid of electric sparks and/or hot surfaces according to the proposed invention:

this process proves to be insensitive to all substances (impurities) from the post-accident atmosphere;

no additional openings are required in the CV wall; electric lead-throughs are as a rule available in sufficient numbers;

no mechanically moving parts are required in the CV for the process and the functioning of the devices;

ignition of the combustion of the gas mixture takes place only if the grille is undamaged;

intensified cooling of the grille allows increased $H_2$ conversions;

failure of a device causes no problems, because of the high degree of multiple provision;

$H_2$/air mixtures capable of detonation can be removed in an explosion-proof manner;

failure or overheating of the grille leads to switching-off of the ignition sparks and/or of the heating of the hot surfaces and hence to an interruption of the hydrogen combustion in the particular device, so that reliable protection from an uncontrolled explosion or detonation of hydrogen in the remainder of the CV is ensured;

the exothermic hydrogen combustion leads to increased convection in the post-accident atmosphere and hence to increased throughput of hydrogen/air mixture through the part volumes;

the devices are maintenance-free and are not impaired in their operability even in the long term by chemical impurities in the gas space.

The use of a grille having a mesh width of 0.1 mm has proved to be advantageous for the removal of hydrogen.

The process presented and the devices for it are not restricted to a combustion of $H_2$ in the nuclear field. In chemical plants, flammable gas mixtures can be burned and removed equally reliably, in which case, if necessary, appropriate thermal switches respond at temperatures which are specific to the flammable gas mixtures. A grille having a mesh width specific to the flammable gas mixture must likewise be chosen. A functional proof of the devices has been carried out experimentally for butane and methane. The use of a grille having a mesh width of 0.7 mm has proved to be advantageous for the removal of butane and methane.

I claim:

1. A process for the removal of flammable gas mixtures in a gas space, comprising the steps of:

separating off a part region of the gas space by grilles having mesh-works made from metal wires, said mesh-works having mesh widths between 0.05 mm and 0.7 mm; and executing a combustion in the part region.

2. The process of claim 1, wherein the step of executing a combustion includes the step of initiating the combustion by sparks.

3. The process of claim 1, wherein the step of executing a combustion includes the step of effecting the combustion by means of catalytic surfaces.

4. The method of claim 1, wherein the step of executing a combustion includes the step of initiating the combustion by a hot surface.

5. The method of claim 1, wherein the step of executing a combustion includes the step of initiating the combustion by naked flames.

6. The process of claim 1, further comprising the step of selecting the shortest distance between a point of ignition and the grilles such that a discontinuous, explosion-like combustion of the gas mixtures occurs in the part region.

7. An apparatus for removing a flammable gas mixture in a gas space, comprising:

a combustion chamber;

a plurality of grilles for defining said combustion chamber wherein each grille includes a metal mesh-work, a mesh width of said mesh-work being between 0.05 mm and 0.7 mm; and means for initiating combustion in said combustion chamber.

8. The apparatus of claim 7, wherein the means for initiating combustion includes a sparking plug.

9. The apparatus of claim 7, wherein the means for initiating combustion includes a glow plug.

10. The apparatus of claim 7, wherein the plurality of grilles include sinner grilles and outer grilles, the inner and outer grilles being electrically insulated from one another and made of electrically conductive material, the apparatus further comprising:

a contact sensor for sensing contact between an inner and an outer grille; and a switch controlled by said contact sensor for interrupting electric current to said means for initiating combustion.

11. The apparatus of claim 10, further comprising a temperature sensor for sensing temperature on a grille; and a switch controlled by said temperature sensor for interrupting electric current to said means for initiating combustion.

12. The apparatus of claim 11, wherein the temperature sensor senses temperature on an inner grille.

13. The apparatus of claim 11, wherein an ignition sequence frequency of the means for initiating combustion is controlled by an output signal of the temperature sensor.

14. The apparatus of claim 7, further comprising fusible cut-outs which are thermally conductive connected to a grille and electrically connected to said means for initiating combustion, said fusible cut-outs having a fusion temperature that is approximately $\frac{3}{4}$ of an ignition temperature of the flammable gas mixture.

15. An apparatus according to claim 11, wherein said means for initiating combustion includes a controllable naked flame which is controlled to open or close by an output signal of the temperature sensor.

16. An apparatus according to claim 7, further comprising baffles for producing a gas mixture flow through the combustion chamber and wherein the baffles are located outside the combustion chamber.

17. The apparatus of claim 7, further comprising fans for producing a gas mixture flow through the combustion chamber and wherein the fans are arranged outside the combustion chamber.

18. The apparatus of claim 16, wherein the baffles extend upwardly from said combustion chamber so that the gas mixture flow through the combustion chamber rises due to the chimney effect.

19. The apparatus of claim 7, further comprising a heat removal device for removing heat from a grille.

20. The apparatus of claim 19, wherein the heat removal device includes a heat pipe.

21. The apparatus of claim 7, wherein the metal mesh-work is made of stainless steel.

22. The apparatus of claim 7, wherein the combustion chamber has a large surface area and a small height.

23. The apparatus of claim 7, further comprising temperature sensors located above an below said combustion chamber for comparing gas temperatures above and below the combustion chamber.

24. The apparatus of claim 7, further comprising electromagnetic radiation sensors for detecting electromagnetic radiation which is emitted during the combustion or absorbed by reaction product.

25. An apparatus for removing a flammable gas mixture in a gas space comprising:

a plurality of devices, each device comprising:
  a combustion chamber;
  a plurality of grilles for defining said combustion chamber wherein each grille includes a metal mesh-work, a mesh width of said mesh-work being between 0.05 mm and 0.7 mm; and
  means for initiating combustion in said combustion chamber;

a common electrical lead for supplying electricity to the plurality of devices wherein the common electrical lead includes branch leads to each of the devices; and electronic delay devices arranged in the branch leads; wherein the means for initiating combustion in each combustion chamber is activated at different times.

* * * * *